United States Patent
Kumar

(10) Patent No.: US 7,604,850 B2
(45) Date of Patent: Oct. 20, 2009

(54) BIAXIAL LIQUID CRYSTAL ELECTRO-OPTIC DEVICES

(75) Inventor: Satyendra Kumar, Kent, OH (US)

(73) Assignee: Kent State University, Kent, OH (US)

( * ) Notice: Subject to any disclaimer, the term of this patent is extended or adjusted under 35 U.S.C. 154(b) by 256 days.

(21) Appl. No.: 11/508,526

(22) Filed: Aug. 23, 2006

(65) Prior Publication Data

US 2007/0108408 A1 May 17, 2007

Related U.S. Application Data

(60) Provisional application No. 60/711,046, filed on Aug. 24, 2005.

(51) Int. Cl.
| | |
|---|---|
| C09K 19/52 | (2006.01) |
| C09K 19/34 | (2006.01) |
| C09K 19/12 | (2006.01) |
| C09K 19/20 | (2006.01) |
| G02F 1/13363 | (2006.01) |

(52) U.S. Cl. .................... 428/1.1; 428/1.3; 252/299.61; 252/299.66; 252/299.67; 252/299.01; 349/117

(58) Field of Classification Search ................. 428/1.1, 428/1.3; 349/117; 252/299.61, 299.66, 299.67
See application file for complete search history.

(56) References Cited

U.S. PATENT DOCUMENTS 6,493,055 B1 * 12/2002 Shimoshikiryo et al. .... 349/141

FOREIGN PATENT DOCUMENTS

| EP | 0 335 348 A2 | 10/1989 |
|---|---|---|
| WO | WO 2005/019380 A1 | 3/2005 |

OTHER PUBLICATIONS

Gortz et al., "Enantioselective segregation in achiral nematic liquid crystals", Chem. Commun., 2005, 3262-3264.*
CAPLUS 2005: 557624.*
Semmler, K. J.K., et al., "Biaxial smectic phases in non-linear mesogens: optical properties and phase behaviour of an oxadiazole liquid crystal", Liquid Crystals, Jun. 1998, vol. 24, No. 6, pp. 799-803, Taylor and Francis, Abingdon, GB, XP-000773002 ISSN: 0267-8292.
Parra, M., et al., "Symmetric esters derived from 1,3,4-oxadiazole: synthesis, mesomorphic properties and structural study by semi-empirical calculations", Liquid Crystals, Nov. 2002, vol. 29, No. 11, pp. 1375-1382, Taylor and Francis, Abingdon, GB, XP-001132301, ISSN: 0267-8292.
Cristiano, R., et al., "Light-emitting bent-shape liquid crystals", Liquid Crystals, Jan. 2005, vol. 32, No. 1, pp. 15-25, Taylor and Francis, Abingdon, GB, XP-001222749, ISSN: 0267-8292.
Lai, Chung K., et al., "Heterocyclic 1,3,4-oxadiazole as columnar core", Liquid Crystals, Jul. 2002, vol. 29, No. 7, pp. 915-920, Taylor and Francis, Abingdon, GB, XP-001125212, ISSN: 0267-8292.
Su, C., et al., "Heterocyclic, 1,2,4-triazoles as calamitic mesogens", Liquid Crystals, May 2004, vol. 31, No. 5, pp. 745-749, Taylor and Francis, Abingdon, GB, XP-001192880, ISSN: 0267-8292.
Diez, S., et al., "Dielectric studies of a laterally-linked siloxane ester dimer", Liquid Crystals, Sep. 2003, vol. 30, No. 9, pp. 1021-1030, Taylor and Francis, Abingdon, GB, XP-001169718.

(Continued)

Primary Examiner—Shean C Wu
(74) Attorney, Agent, or Firm—Fay Sharpe LLP

(57) ABSTRACT

An electro-optical device including a biaxial liquid crystal having a primary and secondary director is provided. A change in orientation of at least one of the directors due to an applied electric field produces a change in the optical state of the device. Response times are increased dramatically over uniaxial nematic based liquid crystal devices, offering improved performance and efficiency.

22 Claims, 8 Drawing Sheets

OTHER PUBLICATIONS

Ponomarenko, S.A., et al., "Liquid crystalline carbosilane dendrimers: First generation", *Liquid Crystals*, Jul. 1996, vol. 21, No. 1, pp. 1-12, Taylor and Francis, Abingdon, GB, XP-000599864.

Parra, M., et al., "New 1,2,4- and 1,3,4-oxadiazole materials: synthesis, and mesomorphic and luminescence properties", *Liquid Crystals*, Aug. 2006, vol. 33, No. 8, pp. 875-882, XP-001246007.

Acharya, B. R., et al., "Biaxial nematic phase in bent-core thermotropic mesogens", *Physical Review Letters*, vol. 92, No. 14, Apr. 9, 2004, pp. 145506-1-145506-4, The American Physical Society 2004.

Madsen, L.A., et al., "Thermotropic Biaxial Nematic Liquid Crystals", *Physical Review Letters*, vol. 92, No. 14, Apr. 9, 2004, pp. 145505-1-145505-4, The American Physical Society 2004.

Brand, H.R., et al., "The Biaxial Nematic—Smectic $C_m$ Transition in Polymeric Liquid Crystals", Makromol. Chem. Rap. Comm. 12, 539 (1991) Federal Republic of Germany.

Geoffrey R. Luckhurst, "A missing phase found at last?"; *Nature*, Jul. 22, 2004, pp. 413-414, vol. 430, Nature Publishing Group (USA).

Klaus Praefcke, "Thermotropic Biaxial Nematics:[1] Highly Desirable Materials, Still Elusive?", *Brazilian Journal of Physics*, Jun. 2002, pp. 564-569, vol. 32, No. 2B (Brazil).

Kirsten Severing, "A Biaxial Nematic Phase in a Thermotropic Liquid Crystalline Side-Chain Polymer," disseration, Mar. 2002-Jul. 2005, am Institut für Makromolekulare Chemie der Albert-Ludwigs-Universität Freiburg im Breisgau (Germany).

* cited by examiner

A103: R = OC$_8$H$_{17}$; R' = C$_{12}$H$_{25}$; I – 190 °C – N$_u$ – 164 °C – N$_b$ – 130 °C – Sm
A110: R = OC$_{12}$H$_{25}$; R' = C$_{12}$H$_{25}$; I – 184 °C – N$_u$ – 167 °C – N$_b$ – 161 °C – Sm

BIAXIAL LIQUID CRYSTAL ELECTRO-OPTIC DEVICES

This application claims the priority benefit of U.S. application Ser. No. 60/711,046, filed Aug. 24, 2005, the disclosure of which is incorporated herein by reference.

STATEMENT OF GOVERNMENT INTEREST

The U.S. Government has a paid-up license in this invention and the right in limited circumstances to require the patent owner to license others on reasonable terms as provided for by the terms of Contract No. NSF-DMR-03-12792 awarded by the National Science Foundation.

BACKGROUND

Conventional liquid crystal devices are based on what may be called the "uniaxial nematic" liquid crystal phase, which has one optic axis. The typical molecules constituting the uniaxial nematic phase are roughly cylindrical molecules. In these devices, the optic axis, also known as the director, is oriented in a predetermined configuration using surface effects. Surface alignment films are prepared on two substrates to persuade the director to be parallel to one of the in-plane directions. The substrates are then put together to fabricate a nematic device in a number of different configurations. If the director orientation at the two surfaces is along orthogonal directions, it results in a twisted nematic (TN) device. If it is at 180° or 270°, it is called a high birefringence effect (HBE) or super twisted nematic (STN) device. Several other modes, e.g. parallel or OCB mode, are known and used.

The operation of such devices relies on producing different optical path-lengths for a beam of light passing through it. An applied electric field is applied by connecting a battery to the conducting electrodes predeposited at the two opposing substrates. The field exerts a torque on the director and tries to make it perpendicular to the substrates. During the change in director reorientation due to the applied field, the elongated LC molecules reorient about their short axis to change from 'lying down' at the substrate to 'standing up' position. Since the index of refraction parallel and perpendicular to the director are different. The "field-off" and "field-on" states appear different to a beam of propagating polarized light and its state of polarization is altered as it passes through such a device. An analyzer positioned at the exit side of the device at proper orientation is used to change the director reorientation in to optical contrast. This forms the principle of operation of LC display devices.

Speed of switching in the nematic devices depends on the elastic constants and the effective viscosity of the liquid crystal used. Generally, the switching speed lies in 10-100's of ms range. The speed of these devices has been one of the limiting factors and the major reason for needing more complex active matrix substrates. It is becoming obvious that faster devices are necessary to make significant advances and produce next generation of LC displays and electro-optical devices. The use of biaxial nematic liquid crystal lends itself to the fabrication of much faster devices.

The existence of a biaxial nematic liquid crystal phase possessing two orthogonal optic axes has previously been predicted. The recent discovery of novel mesophases formed by bent-core liquid crystals has encouraged scientific interest in the study of this phase and the possibility of the biaxial nematic phase being used for technological applications including display devices. In particular, computer simulation of such "boomerang" type molecules has suggested that the bent-core shape could exhibit a stable biaxial nematic phase.

Recently, several studies have confirmed the existence of a stable biaxial nematic phase in several homologous series of liquid crystal compounds.

The molecules that are likely to form a biaxial nematic phase are made of ellipsoidal molecules that have, on average, three different dimensions in contrast to the cylindrical molecules that form the uniaxial nematic phase. They have two optic axes or directors, denoted as m and n (bold letter implies vector or directional nature). The advantage of such materials is that, in addition to reorientation of the principal director n, the secondary director m can also reorient. Reorientation of m requires rotation of its shorter axes about the long molecular axis, which can happen very fast. This is equivalent to a person turning on ones side while lying on a flat surface. Since the biaxial phase has three different indices of refraction in the three spatial directions, this turning (or, spinning) of molecules also offers a change in optical path length in the direction perpendicular to their length and thus a means to fabricate an electro-optical device.

It is now proposed herein that higher switching speeds in an electro-optic device can be realized using a liquid crystal exhibiting such a biaxial nematic phase.

BRIEF SUMMARY

In one embodiment, there is provided an electro-optical device including first and second substrates, each of the first and second substrates coated with an alignment layer, and a liquid crystal material positioned between the substrates, the liquid crystal material including a biaxial liquid crystal having a first principal director n and a secondary director m, wherein a change in the optical properties of the device are effected by reorienting at least one of m and n.

In a second embodiment, there is provided a biaxial retardation film including first and second transparent electrodes, and a liquid crystal material positioned between the electrodes, the liquid crystal material including a biaxial nematic liquid crystal having a first principal director n and a secondary director m, wherein n and m are perpendicular to each other and parallel to the electrodes at an applied electric field of zero.

In a third embodiment, there is provided a method of forming an electro-optical device comprising depositing a liquid crystal material between first and second substrates, each of the first and second substrates coated with an alignment layer, the liquid crystal material comprising a biaxial liquid crystal having a first principal director n and a secondary director m, wherein a change in the optical properties of the device are effected by reorienting at least one of m and n.

DETAILED DESCRIPTION

Figure 1E:
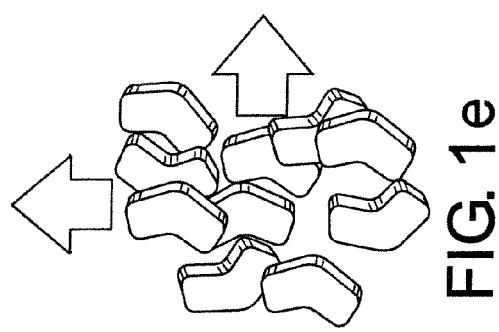
FIG. 1 is an illustration of various nematic liquid crystal phases and their directors.
FIG. 1a uniaxial nematic phase of cylindrical molecules, FIG. 1b uniaxial nematic phase of disk-like molecules, FIG. 1c biaxial nematic phase of a mixture of rod-like and disk-like molecules, FIG. 1d biaxial nematic phase of flat roughly rectangular shaped molecules, and FIG. 1e biaxial nematic phase formed by bent-core molecules.
Figure 1C:
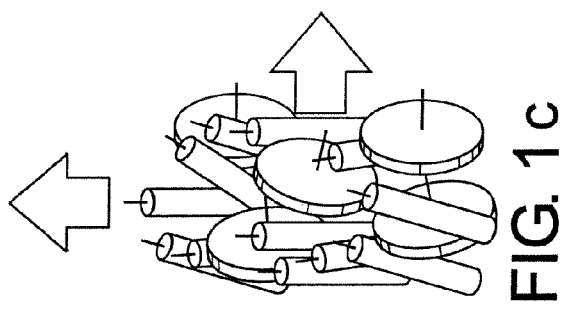
Figure 1B:
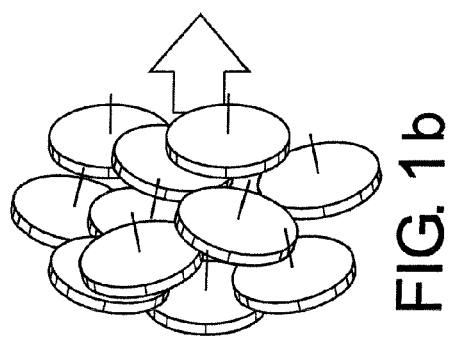
Figure 1D:
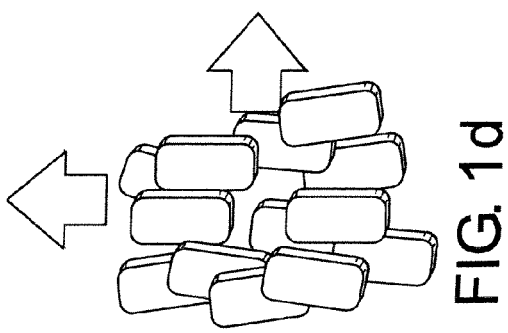
Figure 1A:
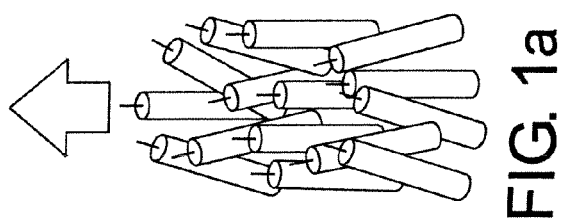
Figure 6:
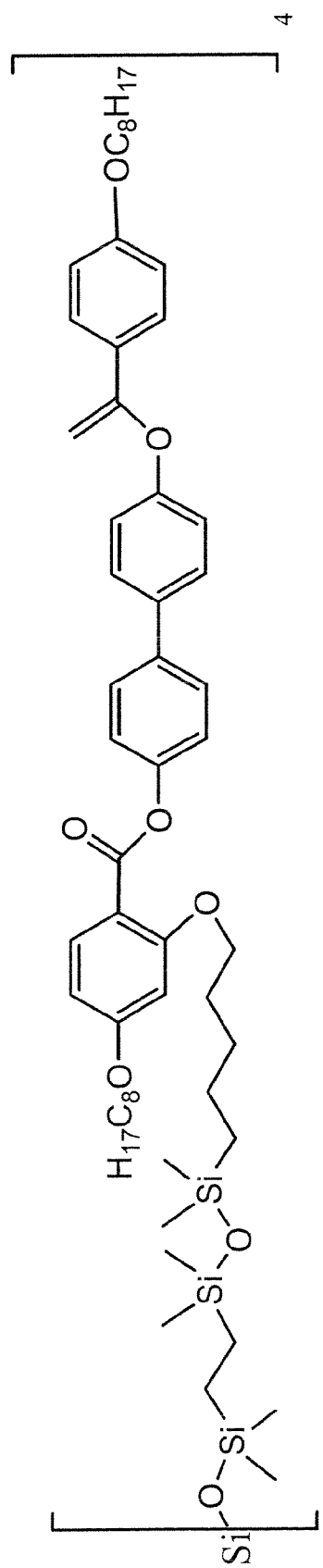
FIG. 6 is a structure of another bent core liquid crystal suitable for use in the present embodiments.
Figure 6:
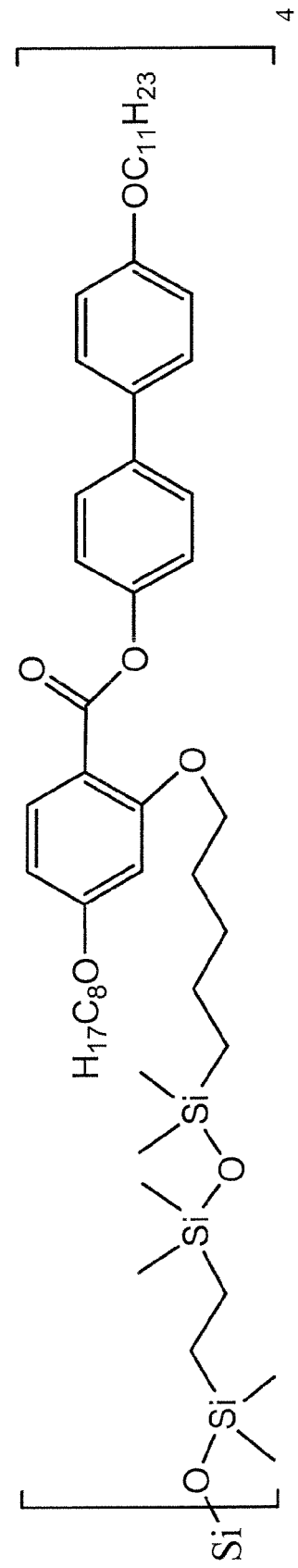

As detailed above, a biaxial nematic phase has recently been discovered in various bent-core or banana-shaped liquid crystal and in tetrapodic liquid crystals of the type shown in FIG. 6. FIG. 1 shows a schematic illustration of various uniaxial nematic phases as well as several recently discovered biaxial nematics with major and minor directors. FIG. 1(a) shows a uniaxial nematic comprised of cylindrically symmetric (calamitic) mesogens while FIG. 1b shows a uniaxial discotic nematic. Biaxial nematic phases are shown in FIGS. 1c, 1d and 4e which consist of a mixture of rods and disks, anisometric parallelpiped platelets, and bent-core mesogens, respectively.

Figure 2A:
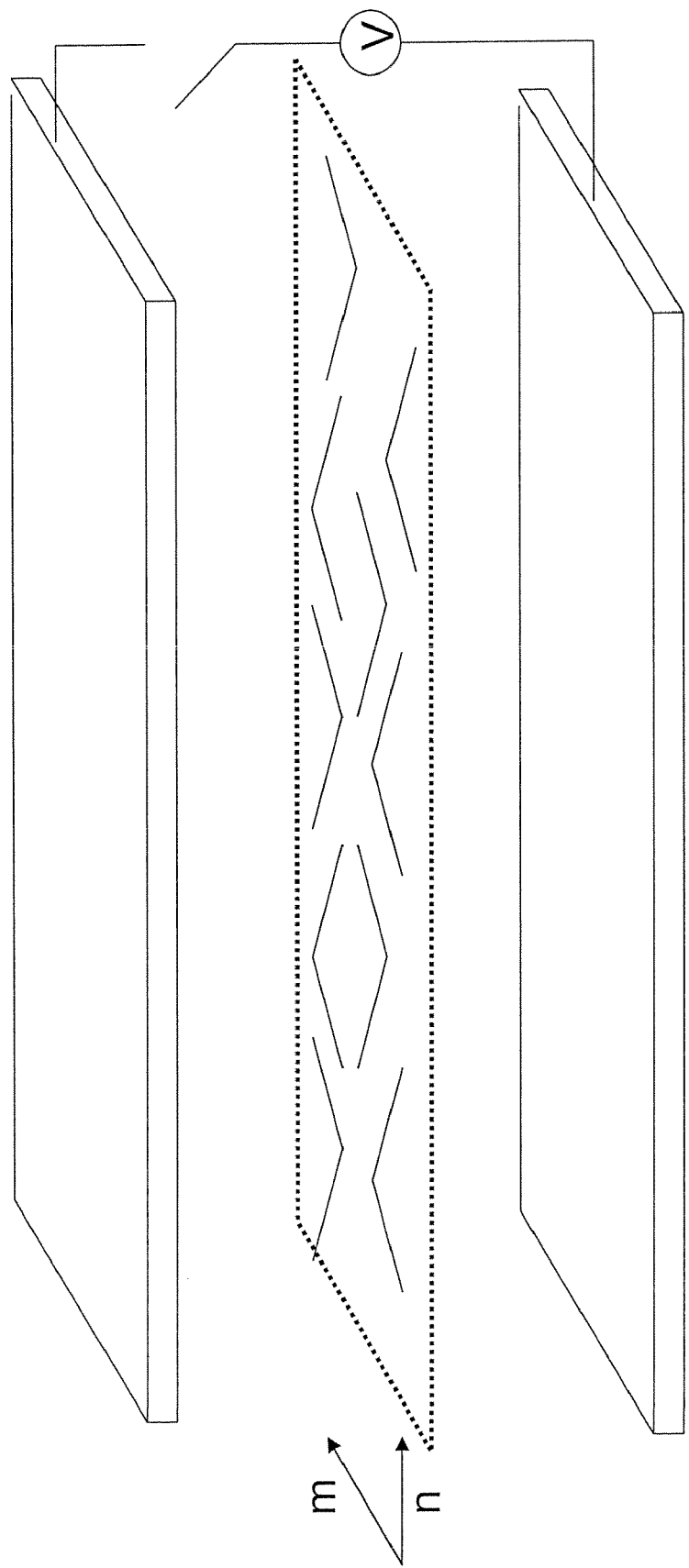
FIGS. 2A and 2B are an illustration of two different configurations of the m director of a biaxial nematic in a cell while the n director orientation remains unchanged.
Figure 2B:
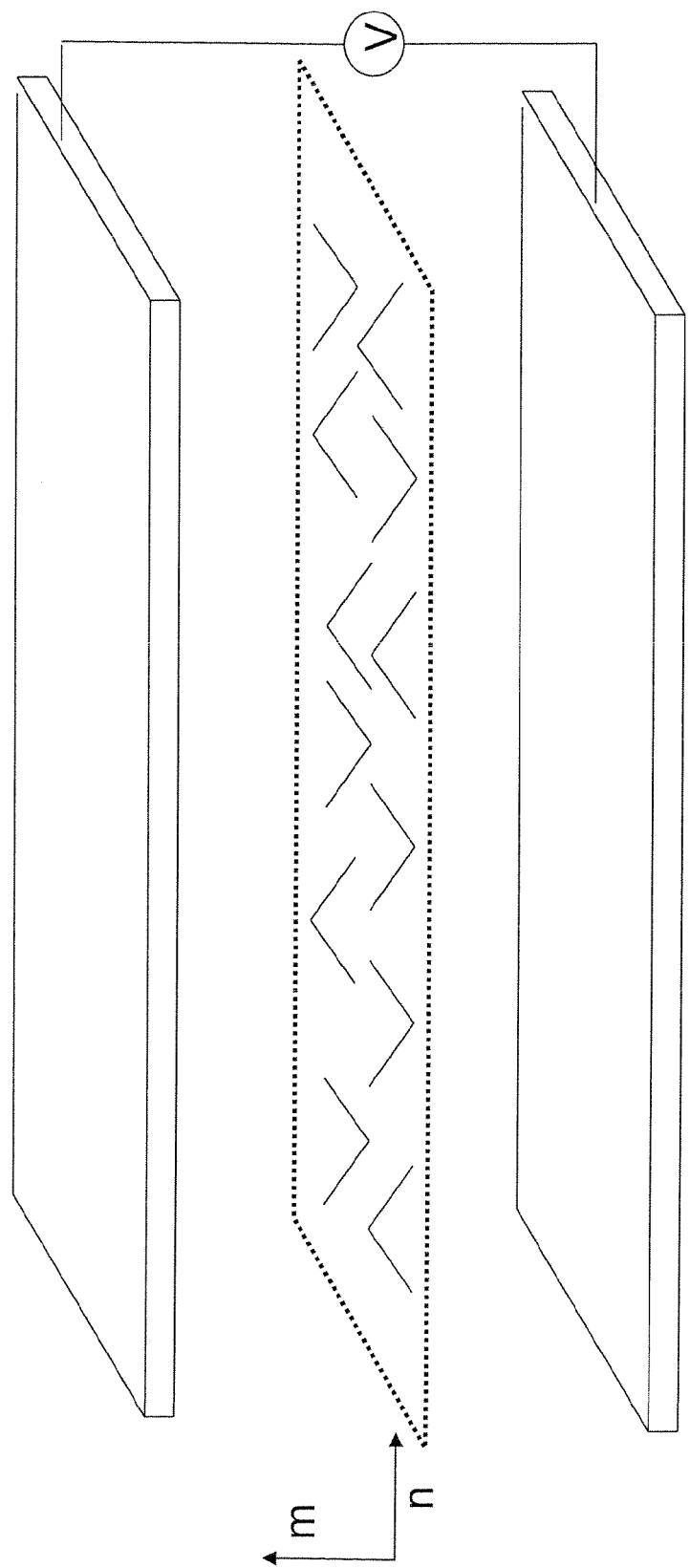
Figure 3:
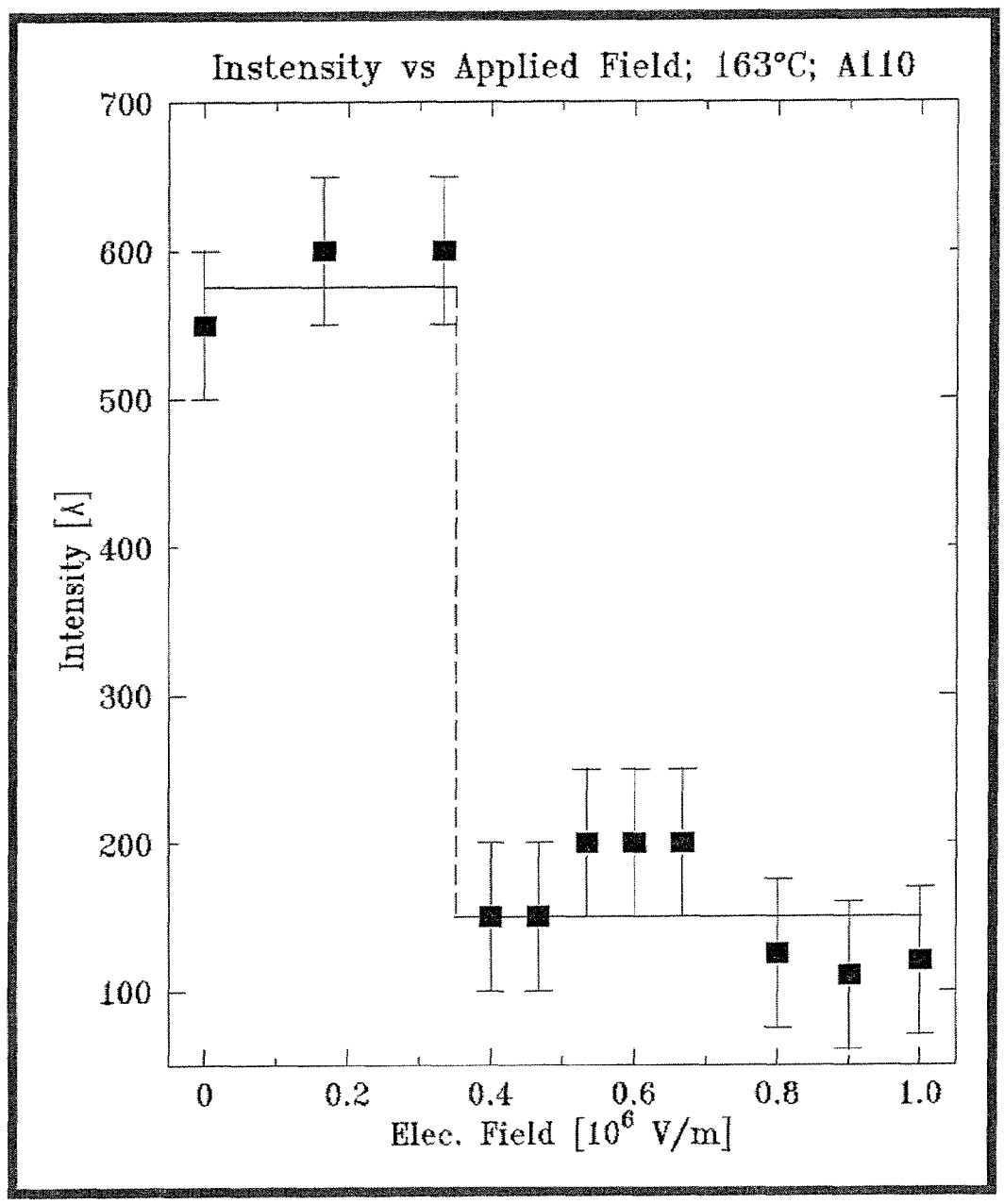
FIG. 3 is a change in x-ray scattered intensity at the Fredericks transition for m in a biaxial nematic liquid crystal as observed with the help of x-ray diffraction experiment.

With respect to bent-core molecules that have chevron-like shape, the direction of n and m lie along the average long axis and the apex of the molecule, respectively. In an electro-optic device, when the biaxial nematic phase of these materials is sealed between two substrates with an accompanying alignment layer, the director n aligns along the rubbing direction of the alignment layer. In a zero voltage state, the plane containing n and m is parallel to the substrates, as seen in FIG. 2A. When an electric field is applied between the substrates, m reorients and become perpendicular to the substrate and parallel to the field, as seen in FIG. 2B. This reorientation, known as Frederick's transition, is observed in x-ray diffraction as a change in scattered intensity from the cell, as seen in FIG. 3. Although the reorientation response time in this x-ray experiment has not been measured, it is expected to be 10 to 100 times faster than in the uniaxial nematic phase.

In one embodiment, the bent core liquid crystal displaying biaxial nematic phase comprises an oxadiazole molecule having the formula:

where $R_1$ and $R_2$ independently comprise a straight chain alkyl or substituted alkyl having from 5 to 20 carbon atoms. Additional bent core liquid crystal molecules suitable for use in the present embodiments include those shown in FIGS. 5 and 6. These examples are not meant to be limiting but merely exemplary of suitable liquid crystal molecules.

Figure 4B:
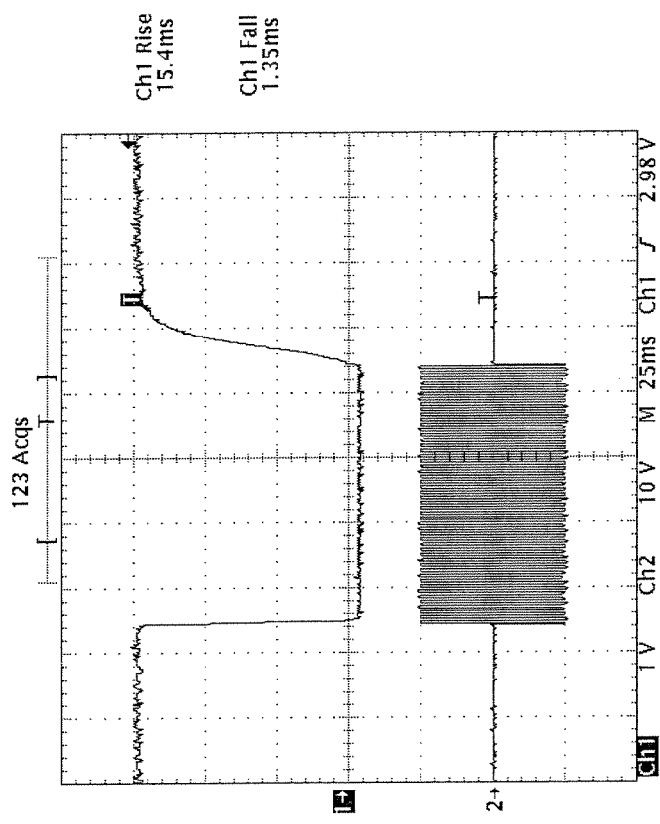
FIG. 4 is a graphic depiction of the response characteristics of the reorientation of the n director in a cell filled with bent-core liquid crystal FIG. 4(a) at 160° C. while the liquid crystal is in the biaxial nematic phase, and FIG. 4(b) at 170° C. while the liquid crystal is in the uniaxial nematic phase. The n switching response is about twice as fast in the biaxial phase as in the uniaxial phase.
Figure 4A:
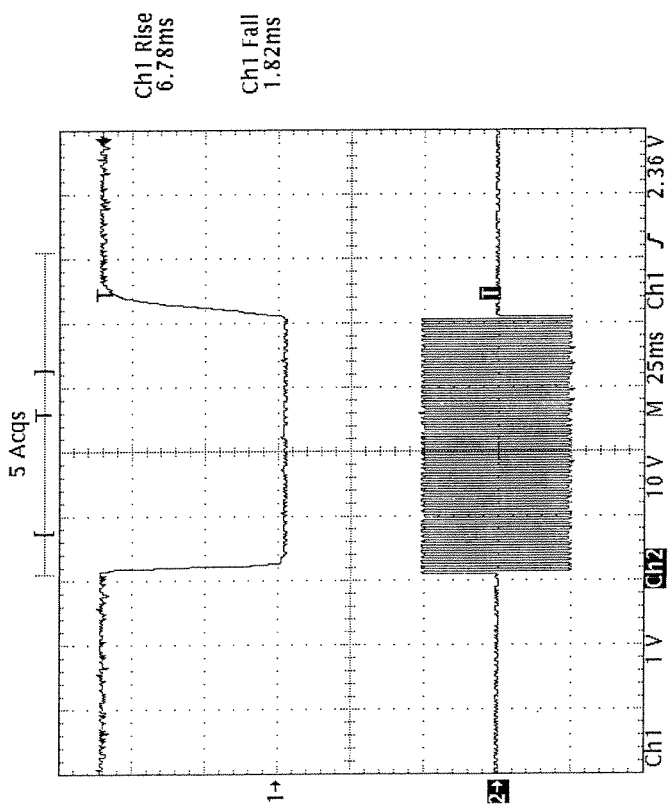

In addition to the expected speed increase in the reorientation of the m director in devices utilizing biaxial nematics, the speed of reorientation of the n director in the biaxial nematic phase has also been found, in one case, to be approximately 2 times faster than in the uniaxial phase of same material, as can be seen in FIG. 4. In FIG. 4, the response characteristics of the reorientation of the n director in a cell filled with bent-core liquid crystal is shown. While in the uniaxial nematic phase at 170° C. (right), the reorientation response time is approximately 15 ms, while in the biaxial nematic phase at 160° C. (left), it is found to be less than 7 ms. This discrepancy is thought to be due to the fact that the ratio of viscosity to the elastic constant is smaller in the biaxial phase than in the uniaxial phase. Thus the use of the biaxial nematic phase offers an advantage even when used like a uniaxial nematic phase (i.e., exploiting the reorientation of n) in devices. The devices using biaxial nematic liquid crystal switch faster than the uniaxial nematic devices, irrespective of whether the electro-optical effects are realized through the reorientation of the m or n director.

Figure 7:
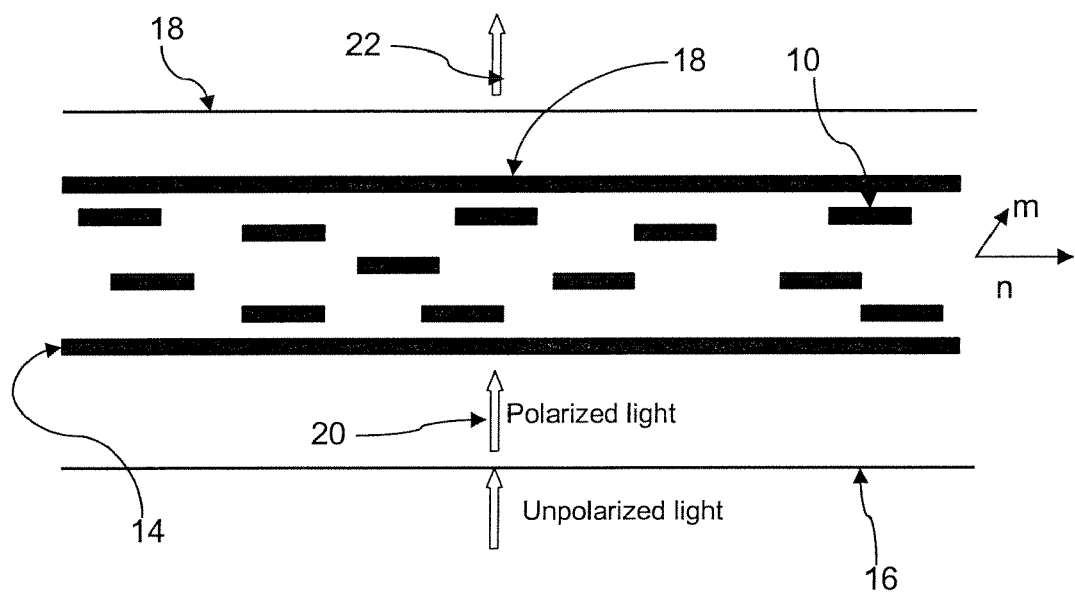
FIG. 7 is a liquid crystal cell according to one embodiment wherein the cell is in a transmitting state with no applied voltage.
Figure 8:
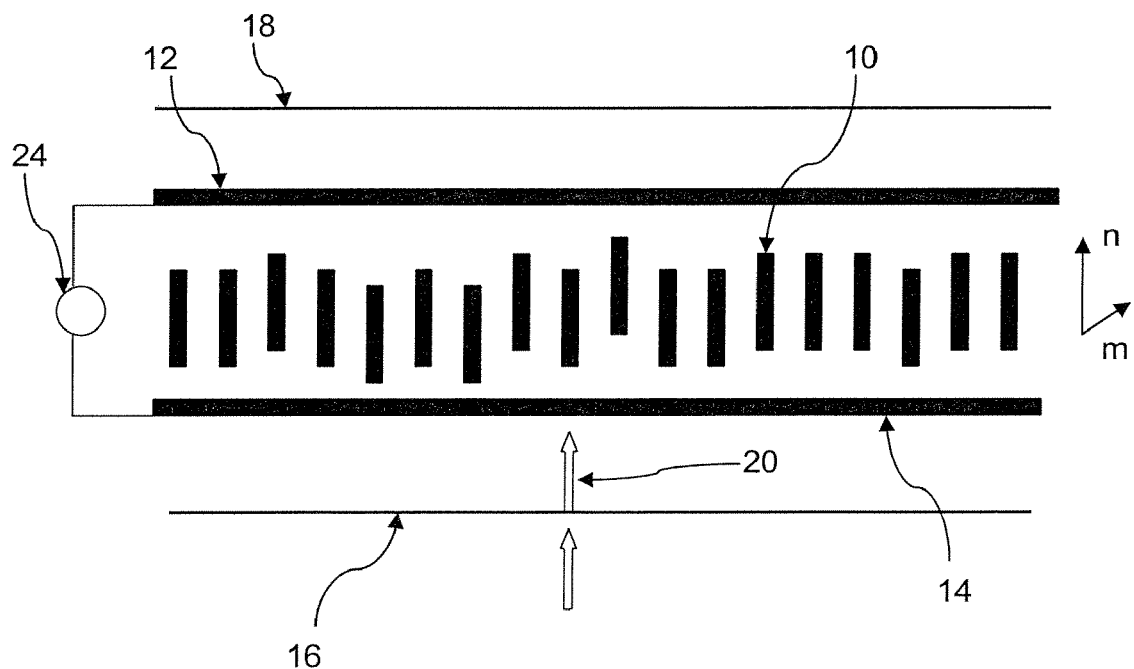
FIG. 8 is a liquid crystal cell according to one embodiment wherein the cell is in a non-transmitting state with an applied voltage.

FIGS. 7 and 8 show an exemplary electro-optical device in accordance with one embodiment. A biaxial nematic liquid crystal 10 having n and m directors is positioned between a pair of opposing substrates 12, 14, which are preferably coated with an alignment layer (not shown), such as rubbed polyimide. Crossed polarizers 16, 18 are positioned on either side of the substrates. The director n aligns along the rubbing direction of the alignment layer. In a zero voltage state, the plane containing n and m is parallel to the substrates, as seen in FIG. 7. This state reorients the polarized light 20 and allows it to be transmitted 22 through the second polarizer. When an electric field is applied between the substrates using a voltage source 24, n reorients vertically, while m remains unchanged, as seen in FIG. 8, or takes up random orientation. Polarized light is prevented from passing through the second polarizer, resulting in a darkened state. This reorientation of n is used to create optical contrast and thus a display device. Such a device switches faster then a device based on uniaxial nematic liquid crystal as shown in FIG. 4(b).

A second significant use of the biaxial nematic, which may also be extended to the biaxial smectic phase that has been confirmed in bent-core materials, is in the fabrication of tunable biaxial retardation films. Such films have been employed to reduce light leakage at 45° to the polarizer and analyzer directions in LC devices. The use of biaxial nematic liquid crystal makes it relatively easy to fabricate retardation films that can be electrically tuned.

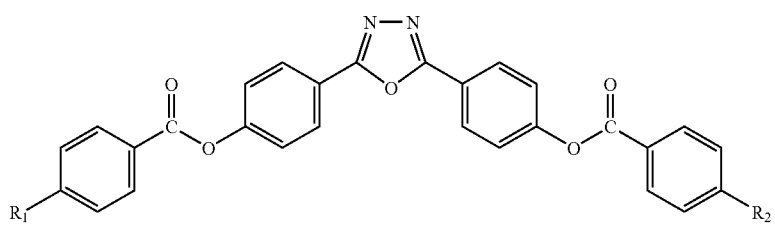

Presently, commercial biaxial retardation films are prepared by constructing multi-layered stacks of uniaxial liquid crystal layers including arrangements of distinct planar and vertically aligned liquid crystal layers with precise control of the thickness and director n orientation. In a fraction of the films in the multi-stack, the uniaxial optical axis is oriented in plane (planar) while in others it is perpendicular to the film's plane (vertical alignment). Composite films of this type behave as biaxial films of constant biaxiality but are cumbersome to produce at high cost. Moreover, once formed, the degree of biaxial retardation that it offers can not be altered.

A uniformly aligned film, of the type shown in FIG. 2, of biaxial nematic phase of bent-core liquid crystal functions, by its very nature, as biaxial retardation film. The fabrication of such a film is essentially one step process of preparing one liquid crystal layer, and thus quite easy. In addition to this ease of construction, an enormous advantage is that the retardation of such a biaxial nematic retardation film is tunable with the application of an electric field.

Specifically, in devices made with biaxial nematic phase liquid crystal, one can exploit both directors. One possibility is that in a single device, one could manipulate n with, say low-frequency electric field to control the optical path length to create optical contrast while controlling m with the help of a high-frequency field to 'compensate'. In this manner, no additional component will need to be incorporated in the device. Elimination of additional components also removes many optical boundaries in the device and reduces spurious light scattering from various interfaces, thereby increasing its efficiency and light throughput. If both directors were exploited for dynamic performance in a device made of the biaxial N phase, it will offer four extreme optical states corresponding to the possibilities of their orientation with respect to the transmitted beam of light.

An exemplary biaxial retardation film comprises two transparent substrates with optically transparent but electrically conducting electrodes deposited on them. The electrodes may be films of indium-tin-oxide (ITO) or conducting polymer. The conductor layer is covered with a polymer which is either treated with polarized UV or mechanically rubbed to produce liquid crystal alignment. Most common method used in the LC industry is a film of polyimide (PI) which is mechanically rubbed after processing it through a prescribed thermal cycle. The methods of deposition, thermal processing, and rubbing are known to those skilled in the art of making LC display devices.

The substrates are then assembled in to a cell with a cell gap, the magnitude of which can be varied depending on the two birefringences of the biaxial nematic phase and desired retardation. The cell gap is typically fixed with the use of glass or plastic spherical or rod-shaped beads as spacers. Normally, the spacers are sprayed on to one of both surfaces before the substrates are assembled in to a cell.

Figure 5:
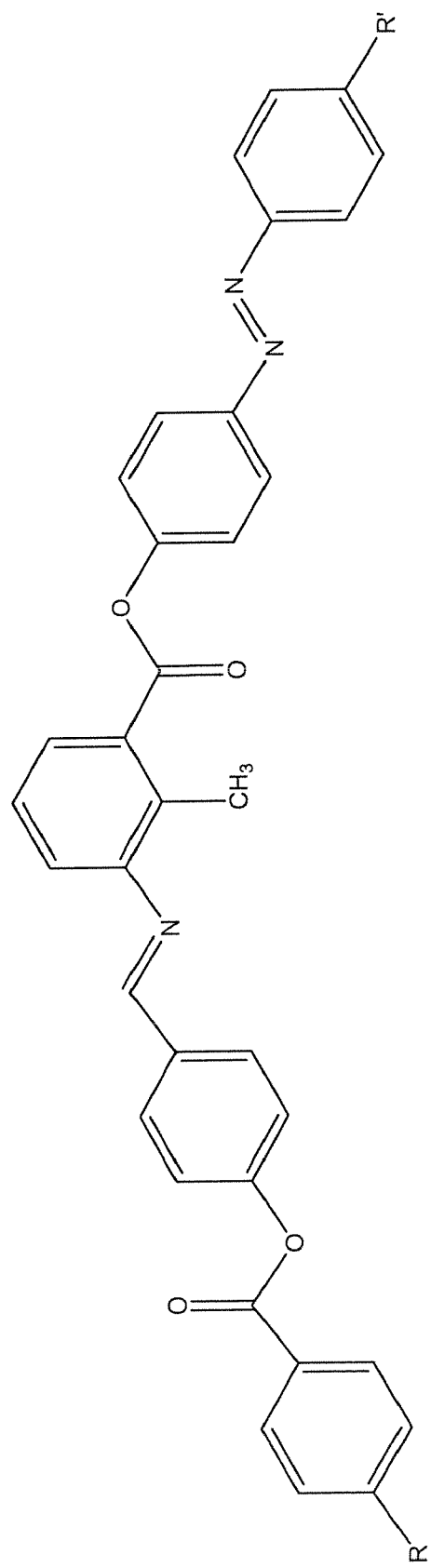
FIG. 5 is a structure of a bent core liquid crystal suitable for use in the present embodiments.

The cell is then filled with the selected liquid crystal, for example with A103 shown in FIG. 5. This compound aligns with n parallel to the rubbing direction and m in the plane of the cell but perpendicular to n. In this state, the cell offers fixed retardations to the two polarization of incident light. The devices architecture resembles the schematic drawing in FIG. 2. The retardation offered by such devices can be controlled by applying a dc or ac electric field of different frequencies to control the orientation of m and/or n. These films act as tunable biaxial retardation films. The special feature of tenability and easy fabrication are possible only with the use of biaxial nematic liquid crystal.

There are many other possibilities for use of biaxial LC devices such as in beam steering, holographic, and optical communications to define and control beam polarization, wave front shaping, and phase and amplitude of electric field associated with propagating light beams. These materials can also be used in photonic crystals.

Much of the above described method of making a device applies to the biaxial smectic-A phase also, which have been recently reported to exist. The difference lies in how the smectic planes and the director m can be aligned for device fabrication. Being a smectic-A phase, some of the problems plaguing the ferroelectric SmC* technology may be absent, rendering this phase a preferred one.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. An electro-optical device comprising first and second substrates, each of said first and second substrates coated with an alignment layer, and a liquid crystal material positioned between said substrates, said liquid crystal material comprising a biaxial nematic liquid crystal having a first principal director n and a secondary director m, wherein a change in the optical properties of said device are effected by reorienting at least one of said m and n.

2. An electro-optical device according to claim 1, wherein said biaxial nematic liquid crystal comprises a bent-core liquid crystal.

3. An electro-optical device according to claim 2, wherein said bent-core liquid crystal comprises at least one of

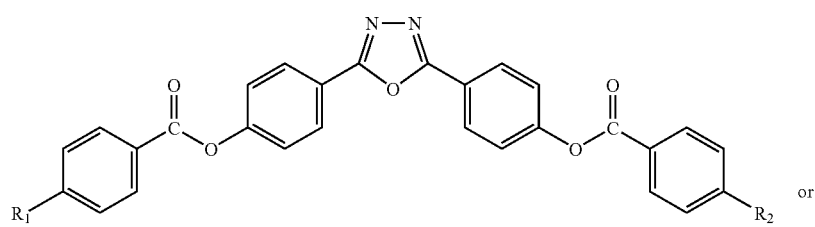

-continued

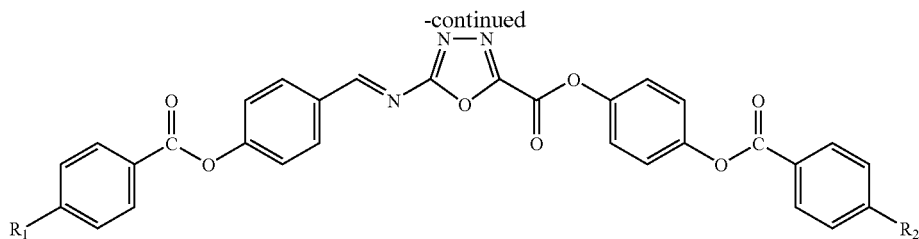

where $R_1$ and $R_2$ independently comprise a straight chain alkyl or substituted alkyl having from 5 to 20 carbon atoms.

4. An electro-optical device according to claim 3, wherein $R_1$ comprises —$OC_8H_{17}$ and $R_2$ comprises —$C_{12}H_{25}$.

5. An electro-optical device according to claim 1, further comprising first and second polarizers, wherein said polarizers are at right angles to each other.

6. An electro-optical device according to claim 1, wherein said biaxial nematic liquid crystal comprises at least one of

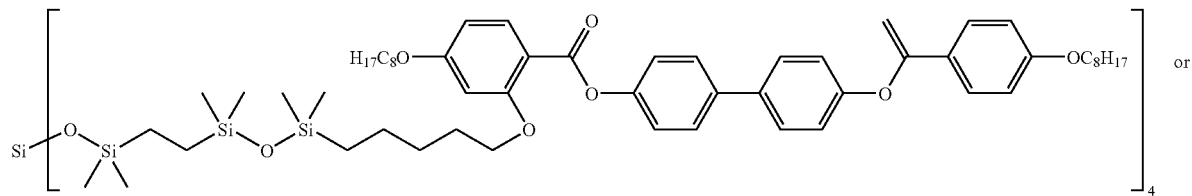

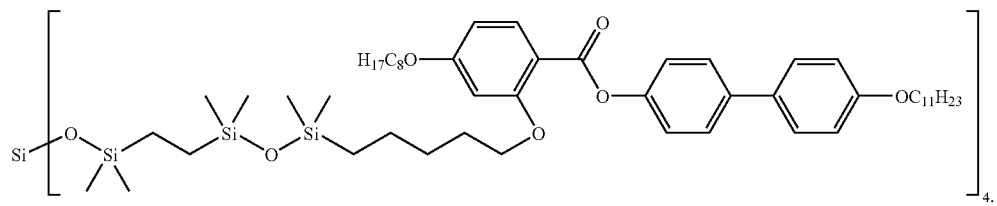

7. An electro-optical device according to claim 1, wherein n lies along the average long axis of the liquid crystal.

8. An electro-optical device according to claim 1, wherein m is perpendicular to n.

9. An electro-optical device according to claim 1, further comprising a voltage source for applying an electric field between said first and second substrates.

10. An electro-optical device according to claim 9, wherein n and m are parallel to said substrates at zero applied voltage.

11. An electro-optical device according to claim 10, wherein at least one of n and m reorients perpendicularly to said substrates at a specified applied voltage.

12. An electro-optical device according to claim 1, wherein said device is capable of switching between first and second optical states at least twice as fast as a uniaxial nematic liquid crystal based electro-optical device.

13. A biaxial retardation film comprising first and second transparent electrodes, and a liquid crystal material positioned between said electrodes, said liquid crystal material comprising a biaxial nematic liquid crystal having a first principal director n and a secondary director m, wherein n and m are perpendicular to each other and parallel to said electrodes at an applied electric field of zero.

14. A biaxial retardation film according to claim 13, wherein at least one of said n and m directors can be reoriented by the application of an electric field.

15. A biaxial retardation film according to claim 13, wherein both n and m can be reoriented independently by the application of an electric field using different tunable frequencies.

16. A biaxial retardation film according to claim 13, wherein said biaxial nematic liquid crystal comprises a bent-core liquid crystal.

17. A biaxial retardation film according to claim 16, wherein said bent-core liquid crystal comprises at least one of

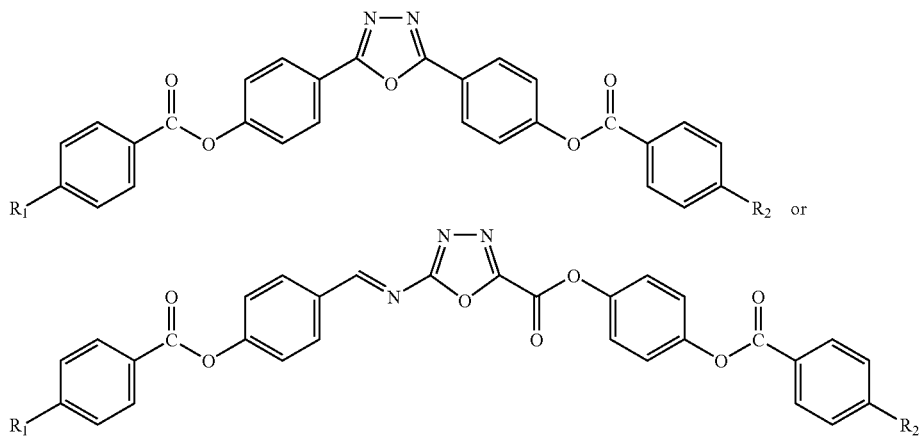

where $R_1$ and $R_2$ independently comprise a straight chain alkyl or substituted alkyl having from 5 to 20 carbon atoms.

18. A biaxial retardation film according to claim 13, wherein $R_1$ comprises —$OC_8H_{17}$ and $R_2$ comprises —$C_{12}H_{25}$.

19. A biaxial retardation film according to claim 13, wherein said biaxial liquid crystal comprises at least one of

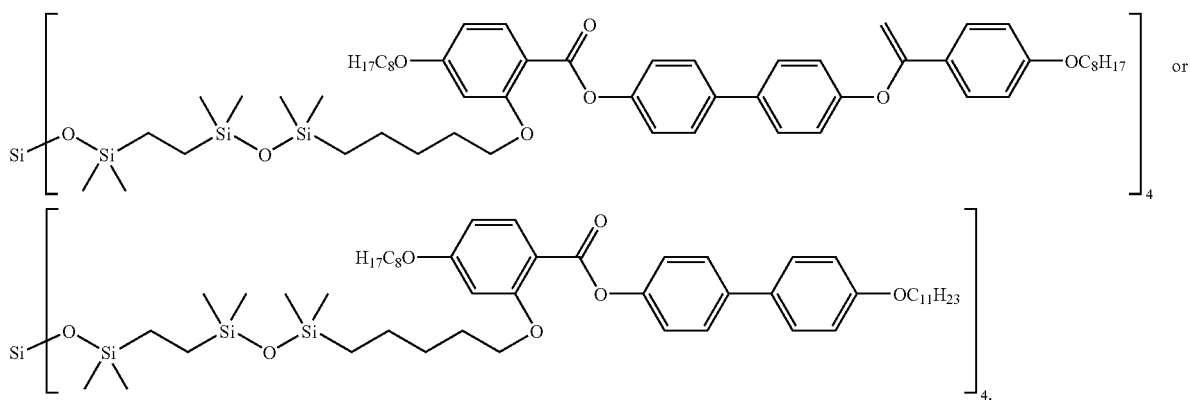

20. A method of forming an electro-optical device comprising depositing a liquid crystal material between first and second substrates, each of said first and second substrates coated with an alignment layer, said liquid crystal material comprising a biaxial nematic liquid crystal having a first principal director n and a secondary director m, wherein a change in the optical properties of said device are effected by reorienting at least one of said m and n.

21. The electro-optical device according to claim 1, wherein both n and m can be reoriented independently by the application of an electric field using different tunable frequencies.

22. The method according to claim 20, wherein both n and m can be reoriented independently by the application of an electric field using different tunable frequencies.

* * * * *